United States Patent
Riedel

(10) Patent No.: US 10,931,807 B2
(45) Date of Patent: Feb. 23, 2021

(54) DEVICE FOR INTERCOM NETWORK

(71) Applicant: RIEDEL Communications International GmbH, Wuppertal (DE)

(72) Inventor: Thomas Riedel, Wuppertal (DE)

(73) Assignee: RIEDEL COMMUNICATIONS INTERNATIONAL GMBH, Wuppertal (DE)

(*) Notice: Subject to any disclaimer, the term of this patent is extended or adjusted under 35 U.S.C. 154(b) by 0 days.

(21) Appl. No.: 15/854,844

(22) Filed: Dec. 27, 2017

(65) Prior Publication Data

US 2018/0288207 A1 Oct. 4, 2018

(30) Foreign Application Priority Data

Mar. 30, 2017 (DE) .......... 10 2017 106 894
Jul. 19, 2017 (DE) .......... 10 2017 116 273

(51) Int. Cl.
| | |
|---|---|
| *H04M 1/725* | (2006.01) |
| *H04B 1/10* | (2006.01) |
| *H04B 1/3827* | (2015.01) |
| *H04L 5/14* | (2006.01) |
| *H04M 1/72513* | (2021.01) |

(52) U.S. Cl.
CPC ...... *H04M 1/72513* (2013.01); *H04B 1/1081* (2013.01); *H04B 1/3827* (2013.01); *H04L 5/14* (2013.01); *H04M 1/7258* (2013.01); *H04M 2250/08* (2013.01)

(58) Field of Classification Search
CPC combination set(s) only.
See application file for complete search history.

(56) References Cited

U.S. PATENT DOCUMENTS

| | | | |
|---|---|---|---|
| 5,222,101 A | 6/1993 | Ariyavisitakul et al. | |
| 5,544,171 A | 8/1996 | Godecker | |
| 5,594,788 A * | 1/1997 | Lin ....................... | H04M 1/654 |
| | | | 379/167.11 |
| 5,694,388 A | 12/1997 | Sawahashi | |
| 5,875,216 A | 2/1999 | Martin | |
| 5,960,046 A | 9/1999 | Morris et al. | |
| 6,032,033 A | 2/2000 | Morris et al. | |
| 6,498,939 B1 | 12/2002 | Thomas | |
| 7,082,314 B2 | 7/2006 | Farmer | |
| 7,120,388 B2 | 10/2006 | Hall | |

(Continued)

FOREIGN PATENT DOCUMENTS

| | | |
|---|---|---|
| AT | 413252 B | 9/1997 |
| DE | 2244098 A | 3/1974 |

(Continued)

*Primary Examiner* — Phung-Hoang J Nguyen
(74) *Attorney, Agent, or Firm* — Andrew Wilford

(57) ABSTRACT

The invention relates to, among others, a network device (10, 11, 12) for an intercom network (13) for permitting an audio communication, in particular a duplex audio communication with other users (14a, 14b, 14c, 14d, 14e, 14f) of the intercom network, comprising a housing (33) and a communication module (20a, 20b) arranged therein or thereon, with which a radio link can be established for the transmission of audio signals to another user, wherein the radio link is subject to the DECT protocol. The speciality, among others, consists in that the network device (10, 11, 12) comprises a means (21) for preventing or reducing multipath interferences.

1 Claim, 3 Drawing Sheets

(56) References Cited

U.S. PATENT DOCUMENTS

Figure 1:
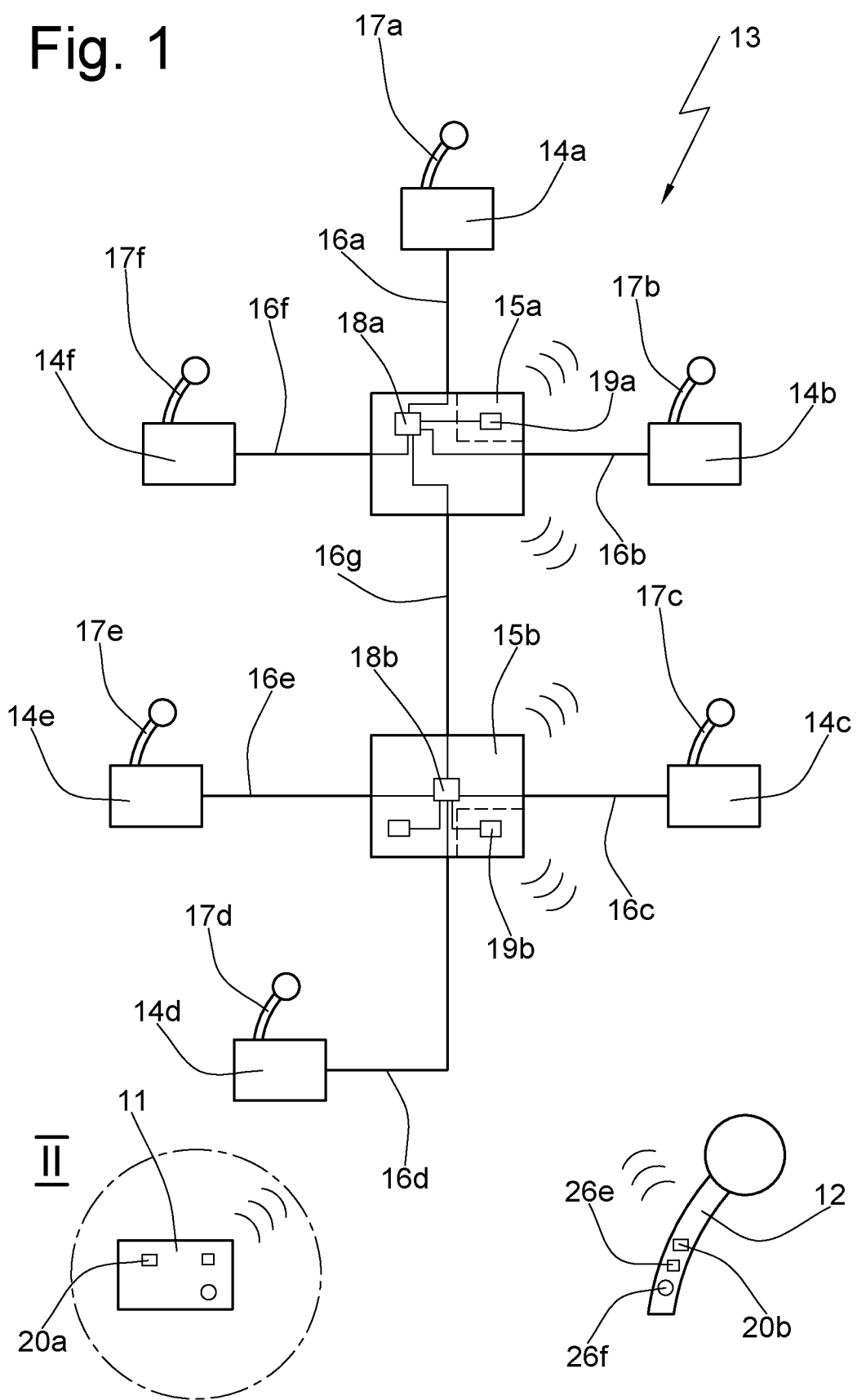

| | | | |
|---|---|---|---|
| 7,454,023 B1 * | 11/2008 | Belt | G10K 15/00 381/122 |
| 7,511,675 B2 | 3/2009 | Puente-Baliarda | |
| 7,522,682 B2 | 4/2009 | Obernosterer | |
| 7,652,980 B2 | 2/2010 | Henriksson | |
| 8,553,865 B2 * | 10/2013 | Menard | H04L 65/605 348/14.09 |
| 8,861,744 B1 | 10/2014 | Solomon et al. | |
| 2002/0123318 A1 | 9/2002 | Lagarrigue et al. | |
| 2003/0058929 A1 | 3/2003 | Cox et al. | |
| 2004/0086099 A1 * | 5/2004 | Romanski | H04Q 3/62 379/201.01 |
| 2004/0116114 A1 * | 6/2004 | Lewiner | H04W 28/26 455/426.2 |
| 2009/0258599 A1 * | 10/2009 | Basine | H04B 1/034 455/41.3 |
| 2010/0189273 A1 * | 7/2010 | Statham | G08C 17/02 381/58 |
| 2011/0093273 A1 * | 4/2011 | Lee | G10L 15/24 704/270 |
| 2014/0375755 A1 * | 12/2014 | Choi | H04N 7/152 348/14.09 |
| 2016/0050505 A1 | 2/2016 | Riedel | |

FOREIGN PATENT DOCUMENTS

| | | |
|---|---|---|
| DE | 10304669 A1 | 8/2004 |
| DE | 102017107148 A1 | 6/2018 |
| DE | 102017107150 A1 | 6/2018 |
| EP | 2211516 A | 7/2010 |
| GB | 2370952 A | 7/2002 |
| WO | 2005099156 A | 10/1985 |
| WO | 2004/017655 A1 | 2/2004 |
| WO | 2007091821 A | 8/2007 |

* cited by examiner

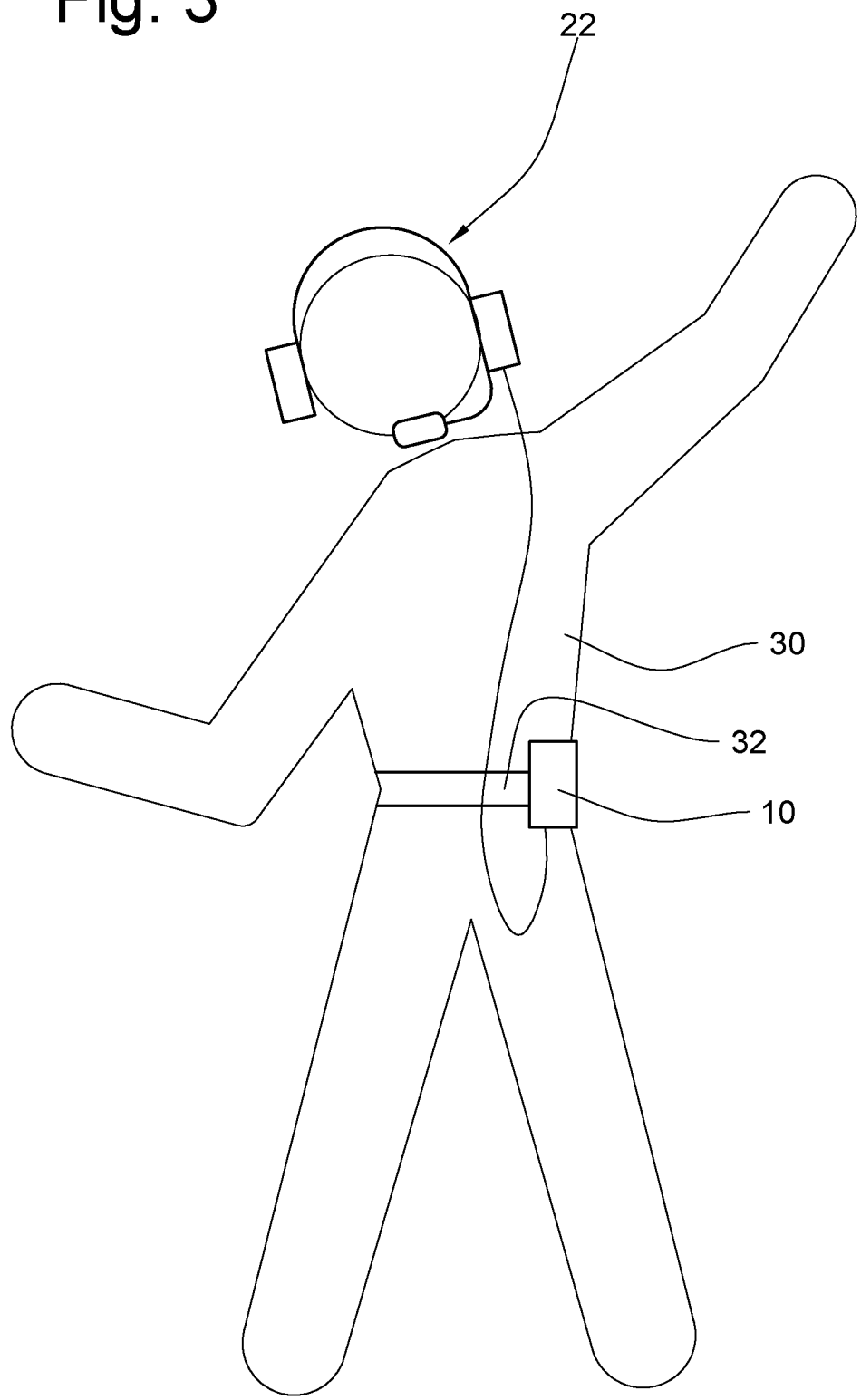

DEVICE FOR INTERCOM NETWORK

The invention relates to a network device for an intercom network according to the preamble of claim 1.

Such network devices permit operation in a duplex listening and talking mode for audio communication with other users of an intercom network.

A network device of this kind in terms of the preamble of claim 1 is generally called an intercom station. A difference is made between stationary intercom stations and mobile intercom stations, such as those attached the belt of a person (belt packs).

An intercom network may comprise one or more stationary users and one or more mobile users. Also known are intercom networks that comprise only stationary or only mobile users.

The users are connected to each other by means of so-called switching centers.

Network devices according to the preamble of claim 1 have been developed and marketed by the applicant for a long time and are being used in respective intercom networks. In acknowledgment of the state of the art reference should be made to the applicant's German patent applications DE 10 2014 011 963 [US 2016/0050505], DE 10 2016 123 966 A1 and DE 10 2016 123 968 A1, the disclosure content of which is herewith included in the content of the present patent application also for the purpose of including one or more of the characteristics.

The known network device according to the preamble of claim 1 comprises a housing containing a communication module. The communication module is a commonly used commercially available electronic module that can establish a radio link to other users of the intercom network. A radio link to other users can be established by means of the communication module that serves the transmission of audio signals. Insofar the radio link permits a bidirectional transmission of audio signals.

Duplex audio communication, i.e. bidirectional transmission of audio data between individual users, insofar as wireless, takes place via this radio link.

The invention only relates to those network devices that are designed to facilitate a radio link according to the DECT protocol or to another protocol. The DECT protocol in the eyes of experts generally denotes an international telecommunication standard using radio technology that has been developed for cordless telephones. The DECT radio standard is designed for the telephony inside of buildings with a range of about 50 meters maximum. Data transmission is based on a so-called "time division duplex" as well as "time division multiple access and frequency division multiple access" method. The predominantly used frequency range is between 1880 and 1900 MHZ. Extension frequency bands also exist in frequency ranges between 1900 and 2480 MHZ.

Other protocols in terms of this patent application are protocols that permit a corresponding radio signal transmission in the frequency ranges VHF, UHF, 2.4 GHz or 5.8 GHz.

In order to avoid repetitions the term DECT protocol in terms of this patent application is to be understood in a broader sense and in addition to the actual DECT frequency ranges also comprises VHF, UHF, 2.4 GHz and 5.8 GHz frequency bands/frequency ranges.

Generic network devices for intercom networks are used in intercom networks that in particular are used temporarily, also in or on buildings, in particular in large halls. A number of generic mobile network devices of the generic kind may be used simultaneously.

In some application cases in which known network devices of the generic kind are operated, interferences may occur in the communication between the users of the intercom network.

Based on these facts it is the requirement of the invention to further develop a network device according to the preamble of claim 1 in such a way that these interferences are avoided.

This requirement is met by the invention with the characteristics of claim 1, in particular with those of the characterizing part, and is therefore characterized in that the network device comprises a means for preventing or reducing multipath interferences.

The principle of the invention consists in assigning a means to the network device that prevents or reduces possible multipath interferences.

This means comprises a device for signal correction in order to prevent or to reduce the multipath phenomenon.

The invention recognizes that in certain application situations a radio link between two wirelessly connected users of the intercom network leads to the generation of a number of radio paths.

As such a first radio path for example may be established between a first network device and a second network device along the shortest route (line of sight) between these two network devices.

Since however the emission of the radio signals does not follow along a straight line like for example a laser beam, but propagates along a possibly very large solid angle range, part of the emitted signal output—while forming and following a second radio path or track—may be transmitted from the transmitting network device to the receiving network device in such a way that it is reflected from a building surface. In other words these radio signals reflected such are also transmitted, but along a second radio path between these two network devices.

This multipath propagation (or phenomenon) that is known as such, can in particular occur in large halls, and further, in particular, with large distances between network devices connected with each other via a radio path, and in particular when operating an intercom network with a multitude of network devices. With a network device that receives the radio signal, this results in a superimposition or interference of the intrinsically identical radio signals received from different paths or "tracks" in the state of the art. Due to this interference, for example caused by different runtimes or phase shifts, there may occur a constructive superimposition or destructive superimposition of the radio signals. The result may be a marked deterioration in signal quality of the received radio signals. In certain circumstances this may even cause a partial or temporary interruption of the radio link.

The described phenomenon of multipath propagation is known in principle from applications other than the one according to the invention, i.e. in particular from mobile telephones and GPS systems. Proposals are known from these fields of application that have tried to solve this problem electronically in order to prevent or reduce interferences.

With network devices for intercom networks of the generic kind that establish radio links according to the DECT standard, however, no means are known for reducing or lowering multipath interferences.

Since DECT is a radio standard designed only for cordless telephones with only a short range, these problems described above were observed in network devices of an intercom network, did not at all occur in cordless telephones and other devices that use the DECT radio technology.

The invention realizes that in order to reduce multipath interferences, appropriate electronics can be arranged in the network device.

This can be utilized to solve the problems occurring in the state of the art.

The network device according to the invention may be a mobile, i.e. a portable device worn in particular by a person, or a stationary device mounted in a fixed position. The network device according to the invention can, at any rate, establish a radio link to another user of the intercom network. Provision may be made for two network devices to be connected directly with each other by a radio link in accordance with the DECT standard. The invention also covers the case, however, in which the network device according to the invention establishes a radio link according to the DECT standard with another user of the intercom network, e.g. with a switching center or a so-called base or an antenna. By base or antenna is understood a user of the intercom network, via which, at any rate, radio signals can be received from, or can be sent to, mobile network devices.

In particular the invention relates to a network device for an intercom network, in which users with portable network devices can move around and can establish DECT radio links with other different users of the network at different points in time.

The network device according to the invention permits duplex audio communication with other users of the intercom network, in particular it permits simultaneous operation in a listing and talking mode. Another term for the network device according to the invention is, in particular, an "intercom station".

According to the invention the network device comprises a means for preventing or reducing multipath interferences. This can be done making use of intrinsically known methods and intrinsically known components used in the art for other purposes such as in mobile telephones. This can be done, but with the proviso of adaptation to the special frequencies used in a DECT protocol as well as to the special signal processing method that is used in a DECT protocol.

The means provided according to the invention for preventing or reducing multipath interferences may resort to adaptive filters that are based on the least-squares-method. The respective information relating thereto is revealed e.g. in the article "An adaptive multipath estimation/elimination technique for GPS signals reception", Masateru Minami et al, Electron CommJpan Pt1, 86(1): 74-82, 2003.

Other suitable devices and methods, which the means according to the invention can use, can be obtained for example from Messrs. Novatel. Information can, for example, be found in "Mattos, Philip G., "Multipath elimination for the low-cost consumer GPS", Proceedings of the 9th International Technical Meeting of the Satellite Division of the Institute of Navigation (ION GPS 1996), Kansas City, Mo., September 1996, pp. 665-671".

The network device according to the invention, in order to design a means for preventing or reducing multipath interferences, can also comprise devices and methods as described in the article "Eliminating multipath fading improves wireless signal reception", SPIE 7 Aug. 2006 by George W. Webb et al.

Furthermore it is possible to obtain commercial components or parts that—provided they are adapted to suit the DECT method—are suitable for providing a means for use in the network device according to the invention, from Messrs. Novatel under the name MET (Multipath Elimination Technology) that have been available at least since the year 1994.

Finally in order to better understand the technology applicable to the means of a network device according to the invention reference should be made to section 22.4.2 "Single-Antenna Multipath Mitigation Techniques" in the Signal Processing for Mobile Communications handbook. Here adequate descriptions regarding possible method types can be found both on the principle of the "Narrow Correlator" and on the principle of the "Multipath Elimination Delay Lock Loop" that can both be used in relation to this means.

Further devices and methods that can be used for a network device according to the invention and for designing the means, are described—for different applications—in for example the following publications: EP 2 244 098 B1, EP 2 215 794 [U.S. Pat. No. 7,652,980], EP 2 211 516 A1, EP 1 982 523 [WO 2007/091821], EP 1 679 818 [U.S. Pat. No. 7,522,682], EP 1 616 368 [U.S. Pat. No. 7,511,675], EP 361 687 [U.S. Pat. No. 5,694,388] and EP 1 221 793 [GB 2,370,952], the content thereof is herewith included in the content of the present patent application in order to avoid repetition.

According to one advantageous design of the invention the network device comprises a loudspeaker and a microphone. This offers the possibility of providing the network device as an intercom station and of resorting to known conventional constructions and designs of network devices.

According to a further advantageous design of the invention the network device comprises at least one programmable or configurable key. In particular the network device may comprise a plurality of such keys.

The programmability of the key permits for example providing a direct audio link between the network device and another intercom network user to be selected.

According to a further advantageous design of the invention the network device is designed as a mobile device portable by a person. The network device may in particular be designed as a belt pack or a mobile microphone. According to this patent application the belt pack is a mobile network device that permits connection to a headset, i.e. a microphone-headset combination.

According to a further advantageous design of the invention the means comprises an RF filter and/or an equalizer. With the aid of these components it is possible to prevent or reduce multipath interferences. Using these electronic components it is possible to perform a signal correction in order to prevent/avoid the multipath phenomenon.

The means according to the invention may for example comprise one or more equalizers. Equalizers are electronic components that are used in the art in other applications, e.g. during GSM transmission, for the purpose of performing a signal correction in order to reduce multipath phenomena.

According to a further advantageous design of the invention the means uses an orthogonal frequency division modulation process (OFDM) or another corresponding demodulating process. Electronic components of this kind utilizing these processes are also quite well known in the state of art and are used in order to prevent or reduce multipath interferences.

According to a further advantageous design of the invention the means according to the invention comprises a Rake receiver. Rake receivers are also known in the art, albeit for other applications, in order to reduce multipath interferences.

According to a further advantageous design of the invention the means is arranged inside the housing. This permits a compact construction of the network device according to the invention.

According to a further aspect the invention relates to an intercom network according to claim 8.

The invention is based on the requirement to further develop an intercom network of the known kind in such a way that the audio signal transmission between users is improved.

This requirement is met by the invention with the characteristics of claim 8.

In an effort to avoid repetition reference should be made to the statements above made in relation to the preceding claims. In order to help with the understanding of the teaching of claim 8 and the interpretation and meaning of the characteristics reference should also be made the information submitted in claims 1 to 7.

Further advantages of the invention are revealed in the sub-claims not cited as well as in the description below of the embodiments depicted in the figures, in which FIG. 1, in a view of a schematic block diagram, shows an embodiment of an intercom network according to the invention wherein two mobile network devices according to the invention are shown, FIG. 2, in a partially cut schematic and partially perspective view, shows an embodiment of a network device according to the invention designed as a belt pack, and connected thereto a headset, wherein two different radio paths between the belt pack and a transmitter of the intercom network are depicted, and FIG. 3, in a schematic view, shows an operator carrying a network device designed as a belt pack according to the invention and a headset connected thereto.

Embodiments of the invention are described by way of example in the figure description hereunder, also with reference to the drawings. For clarity's sake and insofar as different exemplary embodiments are concerned, identical or comparable parts or elements or areas are marked with identical reference symbols, partially with the addition of lower-case letters.

Features that are described only with respect to one embodiment, may be provided also in any other embodiment in terms of the invention. Embodiments altered in this way are also covered by the invention, even if they are not shown in the drawings.

All disclosed features are essential, on their own, to the invention. Fully included in the disclosure of the application is the disclosure content of the associated priority documents (copy of the preliminary application) as well as of the cited publications and the described devices of the state of the art, also for the purpose of including individual or several features of these documents in one or in several of the claims of the present application.

A network device according to the invention is depicted by way of the embodiment in the figures and in its entirety is denoted with 10.

Figure 2:
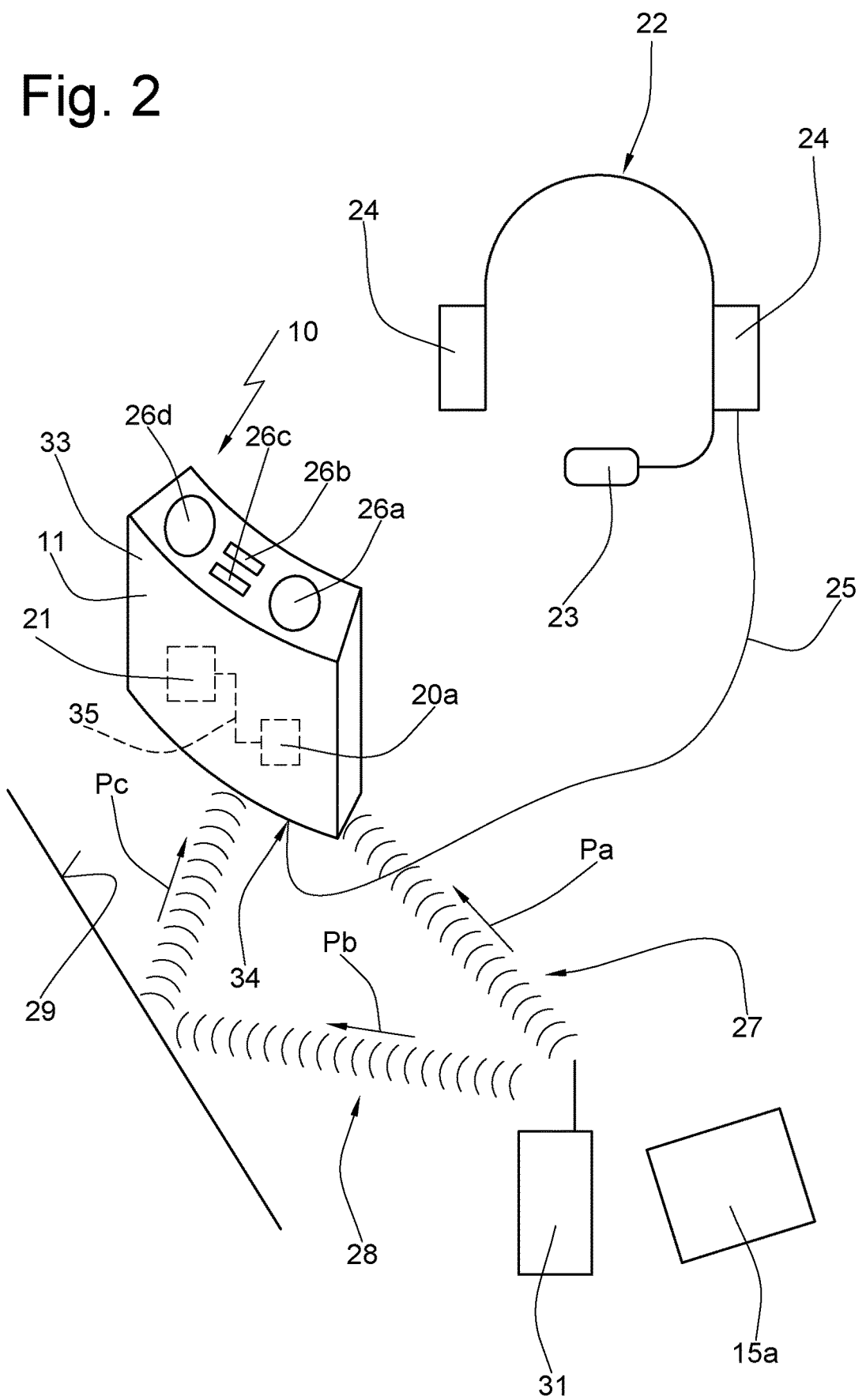

FIG. 2 shows such a network device 10 according to the invention that is designed as a belt pack 11. According to FIG. 2 a headset 22 is connected to the belt pack 11 via a connecting line 25. The headset 22 comprises a microphone 23 and a loudspeaker 24.

The belt pack 11, as schematically shown in FIG. 3, may be attached to a belt 32 of an operator 30 by means of a fastening means not shown and be worn by the operator 30.

The belt pack 11 is part of an intercom network 13, the structure and architecture of which is illustrated in the block diagram of FIG. 1.

The intercom network 13, in the embodiment of FIG. 1, comprises six stationary users in total that are marked by reference symbols 14*a*, 14*b*, 14*c*, 14*d*, 14*e*, 14*f*. These stationary users 14 are so-called intercom stations.

Each of the intercom stations 14*a*, 14*b*, 14*c*, 14*d*, 14*e*, 14*f* is connected via its own connecting line 16*a*, 16*b*, 16*c*, 16*d*, 16*e*, 16*f* with one of the two switching centers 15*a*, 15*b*. The switching centers 15*a*, 15*b* may be connected to each other via a connecting line 16.

Each intercom station comprises a microphone-loudspeaker combination. FIG. 1 shows that each intercom station 14*a*, 14*b*, 14*c*, 14*d*, 14*e*, 14*f* has its own fixedly installed microphone 17*a*, 17*b*, 17*c*, 17*d*, 17*e*, 17*f*. What is not shown in FIG. 1 is that each intercom station 14*a*, 14*b*, 14*c*, 14*d*, 14*e*, 14*f* also has its own loudspeaker.

Further, it is not shown in FIG. 1 that each of the intercom stations 14*a*, 14*b*, 14*c*, 14*d*, 14*e*, 14*f* comprises a plurality of configurable or programmable keys that an operator of an intercom station 14 can actuate in order to establish a direct point-to-point connection with another user at another intercom station 14*a*, 14*b*, 14*c*, 14*d*, 14*e*, 14*f*.

These connection paths are managed by the switching centers 15*a*, 15*b*. To this end each switching center 15*a*, 15*b* comprises at least one control 18*a*, 18*b* that handles the respective switching work.

The stationary users 14*a*, 14*b*, 14*c*, 14*d*, 14*e*, 14*f* are, as the name indicates, arranged in a fixed place and not designed to be moved. The intercom network 13 as per FIG. 1 comprises also however a random number of mobile users, that is mobile network devices.

This includes the initially described belt pack 11 shown in FIG. 1 but also a mobile microphone 12 as shown in FIG. 1. Mobile network devices 11, 12 can be worn by operators 30 and moved by the operators. Whilst in particular the switching centers 15*a*, 15*b* are stationary, i.e. arranged in a fixed place, the operators can be moved at random during an event within range of the intercom network 13.

A mobile network device 11, 12 is able to enter into a radio link with different switching centers 15*a*, 15*b* or other users of the intercom network 13 at different points in time.

In order to be able to establish such a radio link between a mobile network device 11, 12 and another user, e.g. 15*a*, 15*b* of the intercom network 13, a communication module 19*a*, 19*b* is arranged at each of the two switching centers 15*a*, 15*b*. A corresponding communication module 20*a*, 20*b* is also arranged in each mobile network device 11, 12.

The mobile network device 10 in form of the belt pack 11 may for example establish a radio link to the switching center 15*b*. To this end the communication module 20*a* of the belt pack 11 enters into a radio link with the communication module 19*b* of the switching center 15*b*. The radio link is subject to the DECT protocol. Audio signals can be bi-directionally transmitted via the radio path.

When the belt pack 11 is moved by the operator 30, the belt pack 11 can, at a later point in time, also enter into a corresponding radio link with the communication module 19*a* of the second switching center 15*a* via the communication module 20*a*.

FIG. 2 illustrates that the radio link between a belt pack 11 and an antenna 31 is affected by a multipath problem.

The antenna 31 of FIG. 2 may for example be provided by one of the two switching centers 15*a*, 15*b* of the intercom network 13 of FIG. 1. Alternatively the antenna 31 may be a further additional element in the intercom network 13 of FIG. 1 that is connected to one of the switching centers 15a, 15b and that participates in the bidirectional audio data exchange. Finally the antenna 31 of FIG. 2 may be provided by another mobile network device 10, in case there is a need for a direct transmission of radio signals between mobile network devices among each other.

FIG. 2 illustrates that a radio link is achieved by the antenna 31 with a first radio path Pa being provided. The first radio path is the direct shortest connection (line of sight) between the antenna 31/the communication module of the antenna 31 not shown in FIG. 2 and the communication module 20a of the belt pack 11.

FIG. 2 in addition shows that a second radio path is generated that comprises a radio path Pb and a further partial path marked with Pc that is generated after reflection from the building surface 29.

The first radio path is in total also marked with the reference symbol 27, the second radio path with the reference symbol 28.

Both radio paths 27, 28 each connect the antenna 31 with the communication module 20a.

It will be clear to the expert that because of the two different radio paths 27, 28 an interference of the electromagnetic waves may occur in the area of the communication module 20a of the belt pack 11. The interference may be constructive or destructive, in particular. Due to this superimposition signals may be weakened or deleted altogether.

In order to deal with this phenomenon the belt pack 11 according to the invention comprises a means 21 that is assigned to the communication module 20a. This assignment may be effected for example in that the means—as indicated in FIG. 2—is directly connected to the communication module 20a via a connecting line 35. The means 21 may also be part of the communication module 20a. Alternatively the means 21 may be arranged upstream of the communication module 20a in the reception path of the radio signals.

Due to electronic processing of the audio radio signals arriving via the different paths 27, 28, the means 21 can for example, prevent a destructive interference, and/or correct a respective received signal and thereby prevent or reduce the multipath phenomenon.

For example the means 21 of the belt pack 11 according to the invention may be able, to detect different radio paths in the first place, to separate them and e.g. select the radio path 27 with the best signal quality, whilst suppressing the other radio signals arriving via other paths 28.

The network device 10 according to the invention in form of the belt pack 11 in FIG. 2 may, similarly to the mobile microphone 12, include a plurality of programmable or configurable actuating elements 26a, 26b, 26c, 26d, 26e. These may be configured, for example, as keys, switches, a graphic user interface or the like. The network device 10 according to the invention, in particular in form of the belt pack 11, may also comprise a display not shown in FIG. 2.

It will be clear to the expert when looking at FIG. 2 that in addition to the two radio paths 27, 28 shown a plurality of further parallel radio paths may develop of course, causing unwanted interference. Equally the expert will realize that the problem of multipath propagation will increase in line with how many mobile network devices 10 are present in the intercom network 13.

According to the embodiment shown in FIG. 2 the means 21 is arranged inside the housing 33 of the belt pack 11. It is also covered by the invention if the means 21 is arranged on the housing 33 of the network device 10, 11.

FIG. 2 depicts a DECT radio path from the antenna 31 to the belt pack 11. But the expert will recognize that transmission of the radio signal is bidirectional. Consequently the antenna 31 or the alternatively schematically shown switching center 15a in FIG. 2 as well as further advantageously any other user of the intercom network 13 that can establish a DECT radio link for the transmission of audio signals, comprises an appropriate means 21 for reducing or avoiding multipath interferences.

The network device 10 according to the invention in form of a belt pack 11 in FIG. 2 comprises a port 34 for connection to the headset 22. The invention also covers network devices that have a loudspeaker or a microphone arranged directly in or on the housing or assigned to the housing.

According to the depiction in FIG. 1 a communication module 20b is provided on the mobile microphone 12 that corresponds or essentially corresponds to the communication module 20a of the belt pack 11. In addition the mobile microphone 12 may also comprise programmable or configurable keys 26e, 26f, with which certain preliminary settings or configurations can be performed.

The microphone 12, above all, serves to transmit audio information from the microphone to another user, e.g. to a switching center 15b. Microphones 12 are, however, also to be regarded as network devices in terms of the present patent application that additionally comprise a loudspeaker not shown in FIG. 1 or a port for a loudspeaker not shown.

To this extent the invention covers network devices for intercom networks that permit a unidirectional communication with other users of the intercom network, but in particular cover network devices that allow a bidirectional communication with other users of the intercom network.

The invention claimed is:

1. A network device for an intercom network for duplex audio communication between users of the intercom network, the device comprising:
a housing;
a communication module in or at the housing and that can establish a radio link for transmitting audio signals to and receiving audio signals from another user, the radio link being subject to the DECT protocol or another protocol, the audio signals to the communication module being broken by reflection into a plurality of radio paths; and
means for preventing or for reducing multipath interference by:
detecting that a received signal is transmitted via the different radio paths,
separating the radio paths and selecting from the separated radio paths the path with the best signal quality, and
suppressing signal information from all the radio paths except the selected path with the best signal quality.

* * * * *